Feb. 11, 1930. A. M. MERTZANOFF 1,746,710
HEATING APPARATUS
Original Filed Feb. 1, 1923  2 Sheets-Sheet 1
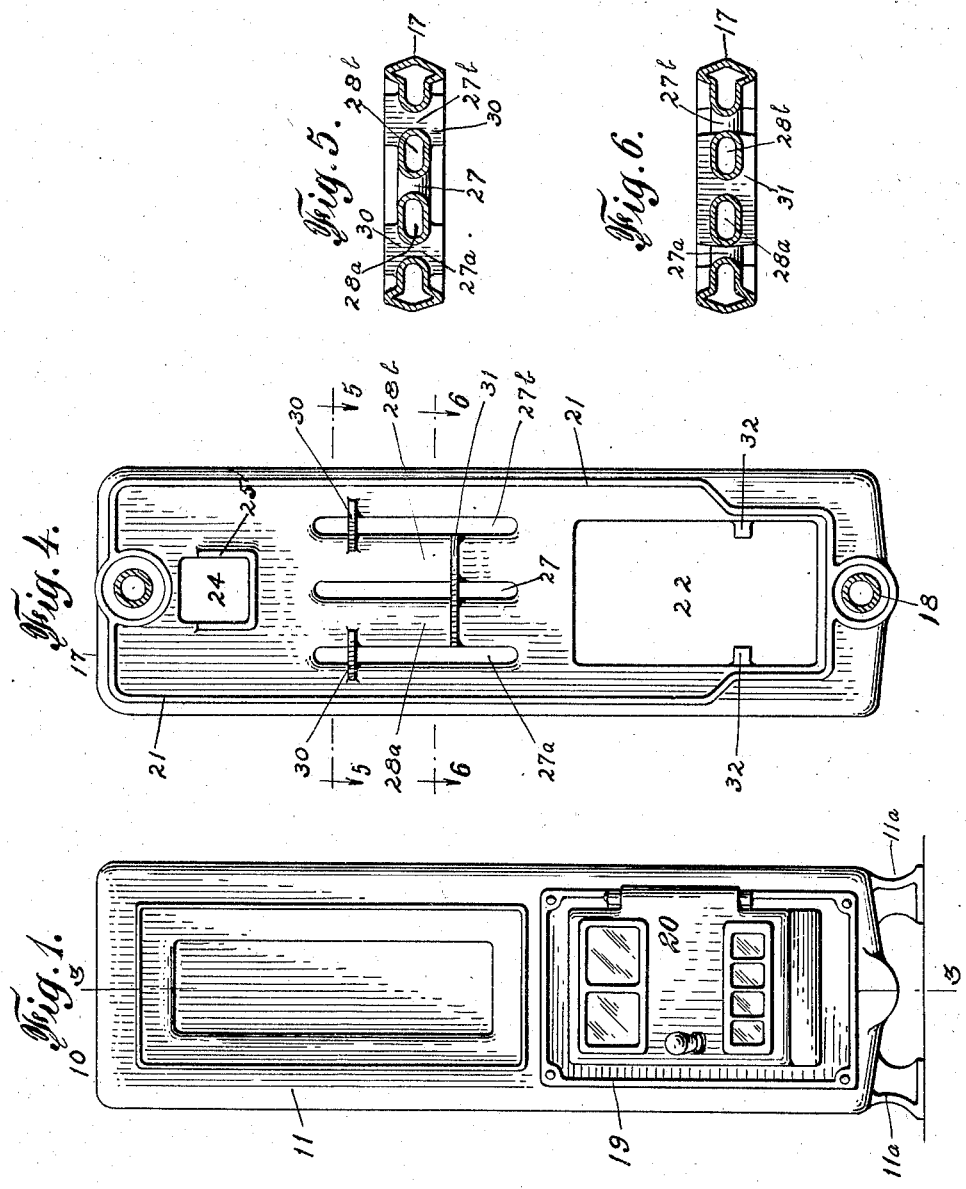

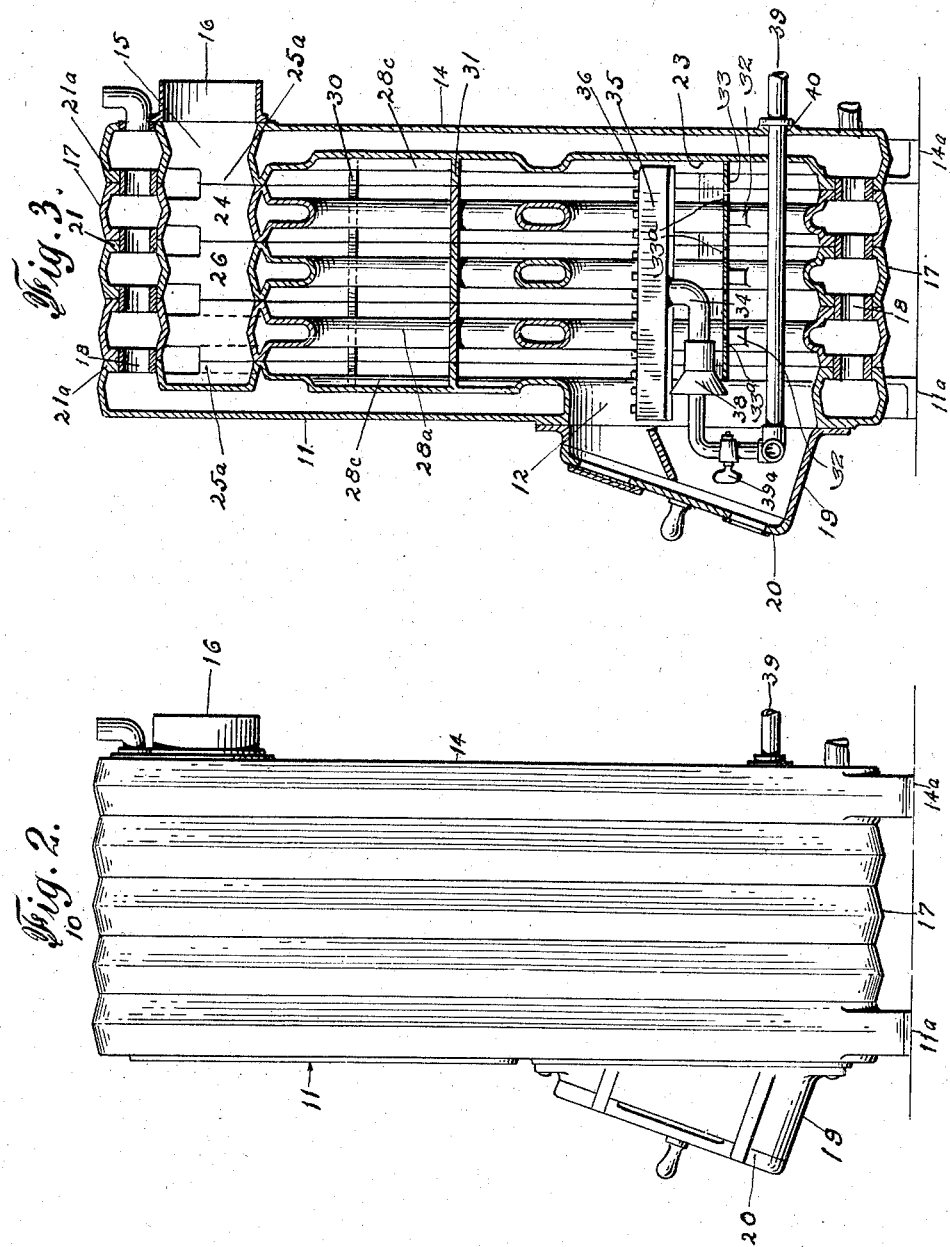

Patented Feb. 11, 1930

1,746,710

UNITED STATES PATENT OFFICE

ANDRÉ M. MERTZANOFF, OF NEW YORK, N. Y., ASSIGNOR TO AMERICAN RADIATOR COMPANY, OF NEW YORK, N. Y., A CORPORATION OF NEW JERSEY

HEATING APPARATUS

Application filed February 1, 1923, Serial No. 616,355. Renewed June 2, 1928.

My invention relates to improvements in heating apparatus, and the same has for its object, more particularly to provide an apparatus using gas as a heating medium, and adapted to heat the room or chamber in which it is located, and also rooms or portions of a room or a building located at a distance from said apparatus.

Further, said invention has for its object to provide a small sectional heating apparatus in which the heating fluid circulating therein may be heated to the desired temperature by gas.

Further, said invention has for its object to provide a small sectional heating apparatus in which the travel of the hot gases or products of combustion is so controlled or retarded that the same will impart substantially their entire heat to the walls of the flue portions of said sections before said gases can reach the outlet or stack.

Further, said invention has for its object to provide a combined boiler and heater formed as a sectional structure having a series of transverse vertical passages between said sections, and separate series of passages arranged at right angles to said transverse passage, and extending through said sections, and having means for deflecting the hot gases and products of combustion, in part, transversely between the sections, and, in part, longitudinally through the passages in said sections in order to retard said gases and products of combustion in their travel from their source to the outlet leading from the apparatus.

Further, said invention has for its object to provide a heating apparatus of the type specified in which the burners are so constructed and arranged that the same may be readily introduced into, or removed from said apparatus when desired.

Further, said invention has for its object to provide a heating apparatus of the character specified in which the burners are separated within the apparatus from the valves for controlling the admission of gas thereto.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings showing one form or embodiment of my said invention;

Figure 1 is a front elevation showing one form of heating apparatus constructed according to, and embodying my said invention;

Fig. 2 is a side elevation;

Fig. 3 is a longitudinal section on the line 3—3 of Fig. 1;

Fig. 4 is a front or face view of one of the intermediate sections.

Fig. 5 is a transverse section through one of the intermediate sections of the apparatus on the line 5—5 of Fig. 4, and Fig. 6 is a similar view taken on the line 6—6 of Fig. 4.

In said drawings, 10 designates a heating apparatus of the type described to be placed in a room or chamber and which serves to heat the same directly, and also to heat, by means of radiators situated therein and connected to said heating apparatus, one or more rooms or chambers located at a distance from said apparatus. The said apparatus is here shown as a combined boiler and radiator comprising a hollow front section 11 having an opening 12 therein adjacent to its base, a hollow back section 14 having an opening 15 therein adjacent to the top thereof to which is secured a smoke hood 16, and between said front and back sections 11, 14 are disposed a plurality of intermediate sections 17 which correspond in outline with said front and back sections 11, 14. The front, back and intermediate sections 11, 14, 17 are provided adjacent to their upper and lower ends with registering apertures in which are secured nipples 18 whereby said sections are secured together in assembled relation.

The front and back sections 11, 14 are provided at their lower corners with feet 11ª, 14ª, and the front section 11 is further provided, over the opening 12, with a casting 19 having a hinged door 20 thereon.

Each intermediate section 17 is provided upon its opposite sides adjacent to its peripheral edge with a laterally extending rim or flange 21. The said rims or flanges 21 are adapted to contact with the registering flanges 21 of the remaining intermediate sections 17, and with the rim or flange parts 21ª of the front and back sections 11, 14 and form a closed chamber or receptacle. The rims or flanges 21, 21ª follow the general outline of the sections, except at their lower portions where the same are constricted slightly vertically and follow the lower portions of the rectangular openings 22 which register substantially with the opening 12 in the front section 11 and the corresponding recess 23 in the back section to form a fuel receptacle or chamber.

Adjacent to its upper edge each intermediate section 17 is provided with a centrally located smaller rectangular opening 24 provided along its base, and partly along its vertical side edges with a rib or flange 25, the edges of which are adapted to contact with the corresponding edges of the adjacent intermediate sections, and the corresponding rib or flange portion 25ª of the front and back sections 11, 14 to form a gas baffle. The said openings 24 and their ribs or flanges 25, 25ª form a main or collecting flue 26 leading to the smoke hood or outlet 15.

The portion of each intermediate section 17 between the combustion chamber opening 22 and the main flue opening 24 is provided with a plurality of vertical slots or passages 27, 27ª, 27ᵇ forming hollow water columns 28ª, 28ᵇ between the same which water columns register with the water column parts 28ᶜ, on the inner faces of said front and back sections 11, 14.

30 denotes short horizontal baffle plate-members which are arranged in the same horizontal plane adjacent to the upper ends of the slots or passages 27ª, 27ᵇ. The said baffle plate members extend partly through said passages, and have their opposite edges terminating on a line coinciding with the edges of the laterally extending rims or flanges 21 of their respective sections. The opposite edges of said baffle plate-members 30 are adapted to contact with the registering edges of the corresponding plate-members of adjacent sections to form two separated continuous baffle plates extending longitudinally of the apparatus.

31 denotes similar, but wider horizontal baffle plate-members, each of which is arranged adjacent to the lower ends of the vertical slots or passages 27, 27ª, 27ᵇ, and extends through the intermediate vertical slot or passage 27, and has its ends terminating at the inner edges of the outer slots or passages 27ª, 27ᵇ. The opposite outer longitudinal edges of said baffle plate-members 31 also terminate in the same vertical plane with the edges of the peripheral rims or flanges 21 of the sections, and are adapted to contact with the registering edges of the corresponding members of adjacent sections to form a continuous baffle plate extending longitudinally of the apparatus.

Upon the inner sides of the combustion chamber are provided lugs 32 upon which is supported a longitudinal partition or plate 33 having openings 33ª therein to supply air uniformly to the gas burners 35 which are provided upon their upper sides with numerous apertures or nozzles 36 for the issuance of the gas.

34 denotes a pipe which extends forwardly and is provided with a funnel-shaped air inlet 38, from which extends a supply pipe 39 having a controlling valve 39ª. The supply pipe 39 and valve 39ª are arranged below the partition or plate 33, and are wholly concealed by the door 20 of the combustion chamber when said door is closed. The lower portion of the supply pipe 39 extends rearwardly and passes through an opening 40 in the back section 14 where its end may be connected with a source of gas supply.

The operation of the apparatus will be obvious. It is to be noted, however, that the burners 35, and all the pipes and control mechanism therefor are located entirely within the apparatus and concealed by the door 20 thereof, when closed, and that the parts disposed below said burners are wholly separated from and protected against said burners by the horizontal metal partition 33.

Further, it will be noted that by reason of the construction and arrangement of the upper portions of the sections, and the passages therein, and the baffle plates therefor, the hot gases and products of combustion will be deflected transversely within the passages between said sections, and longitudinally through the vertical slots or passages in said sections and thereby force said gases into intimate contact with all of the surfaces of the flues leading from the combustion chamber to the outlet.

The above description illustrates the principles embodied in my said invention, but it will be understood that various changes and modifications may be made within the scope of the invention as defined by the claims.

Having thus described my said invention, what I claim and desire to secure by Letters Patent is:

1. A gas-burning heating apparatus formed as a sectional structure comprising a front section, a back section and a plurality of intermediate sections communicating with one another and adapted to contain a circulating heating fluid, and having a chamber, a heating element therein, a collecting flue extending through the upper portion of certain of said sections, a U-shaped baffle extending along the bottom and sides of said collecting flue, an outlet in said back section communicating with said collecting flue, and a plurality of members extending in separated relation transversely across the opposite sides of said sections above said chamber, and forming transversely interrupted and longitudinally continuous baffle plates serving to retard the gases and products of combustion in their travel from said chamber to said outlet, substantially as specified.

2. A gas-burning heating apparatus formed as a sectional structure comprising hollow front, back and intermediate sections secured together in spaced relation with their edges in contact; the lower portions of said sections forming a chamber, and the upper portions of said sections having a plurality of vertical, registering passages extending therethrough, a collecting flue extending through the upper portions of said sections above said vertical passages, a baffle extending along the base and sides of said collecting flue, an outlet in said back section communicating with said collecting flue, a transverse baffle extending partly across each of the opposite sides of said sections and partly through one of said vertical passages, and a plurality of similar baffles arranged above said first-named baffle and each extending partly through one of the remaining of said vertical passages in said sections, a gas burner in said chamber, and a door for closing said chamber, substantially as specified.

3. A gas-burning heating apparatus, formed as a hollow-walled structure and comprising front, back and a plurality of intermediate sections adapted to contain a heating fluid, and collectively forming a chamber with passages between said sections forming flues extending from said chamber, and an outlet communicating with said flues; said intermediate sections having a plurality of vertical registering passages extending therethrough, an integral baffle member located intermediate the ends of each of said vertical passages of each section and extending through the same, the baffle members of said sections registering with those of adjacent sections and forming therewith a continuous horizontal plate extending longitudinally of the apparatus, and serving to retard the hot gases and products of combustion in their travel from said chamber to said outlet, substantially as specified.

4. A gas burning heating apparatus formed as a hollow-walled structure and comprising front, back and a plurality of intermediate sections adapted to contain a heating fluid, and collectively forming a chamber with passages between said sections forming flues extending from said chamber, and an outlet communicating with said flues; said intermediate sections having a plurality of vertical registering passages extending therethrough, baffle members located intermediate the ends of each of said vertical passages of each section and extending through the same, the baffle members of said sections registering with those of adjacent sections and forming therewith continuous horizontal plates extending longitudinally of the apparatus; certain of said baffle members being disposed in different horizontal planes with respect to other of said baffle members and having their adjacent longitudinal edges arranged in overlapping relation, substantially as specified.

5. A gas-burning heating apparatus formed as a hollow-walled structure and comprising front, back and a plurality of intermediate sections adapted to contain a heating fluid, and collectively forming a chamber with passages between said sections forming flues extending from said chamber, and an outlet communicating with said flues; said intermediate sections having a plurality of vertical registering passages extending therethrough, baffle members located intermediate the ends of each of said vertical passages of each section and extending through the same, the baffle members of said sections registering with those of adjacent sections and forming therewith continuous horizontal plates extending longitudinally of the apparatus, and alternate ones of said vertical passages having the baffle members arranged adjacent to their ends, and the intermediate passages having the baffle members arranged adjacent to their lower ends; said upper and lower baffle plates having their adjacent longitudinal edges disposed in overlapping relation, substantially as specified.

6. A gas-burning heating apparatus formed as a hollow-walled structure comprising front, back and a plurality of intermediate sections adapted to contain a heating fluid, and collectively forming a chamber and passages between said sections forming flues extending from said chamber, and an outlet communicating with said flues; said intermediate sections having a plurality of vertical registering passages extending therethrough, a baffle member extending through each of said vertical passages of each section and registering with those of adjacent sections and forming therewith a continuous horizontal baffle plate extending longitudinally of the apparatus; the alternate of said passages each having a relatively narrow baffle member arranged adjacent to one of its ends, and the intermediate passages each having a wider baffle member arranged adjacent to its opposite end, said narrow and wide baffle members having their registering longitudinal edges disposed in overlapping relation, substantially as specified.

Signed at the city of New York, in the county and State of New York, this 31st day of January, one thousand nine hundred and twenty-three.

ANDRÉ M. MERTZANOFF.